Feb. 28, 1967  TATSUYA ICHIHARA ET AL  3,306,105
TURBINE TYPE MASS-FLOW METER
Filed Sept. 29, 1964  2 Sheets-Sheet 1

INVENTORS
TATSUYA ICHIHARA &
ICHIRO IDO
BY
Arthur H. Swanson

Feb. 28, 1967  TATSUYA ICHIHARA ET AL  3,306,105
TURBINE TYPE MASS-FLOW METER
Filed Sept. 29, 1964  2 Sheets-Sheet 2

INVENTORS
TATSUYA ICHIHARA
ICHIRO IDO
BY
Arthur H. Swanson

# United States Patent Office 3,306,105
Patented Feb. 28, 1967

3,306,105
TURBINE TYPE MASS-FLOW METER
Tatsuya Ichihara, Tokyo, and Ichiro Ido, Yokohama, Japan, assignors to Honeywell Inc., a corporation of Delaware
Filed Sept. 29, 1964, Ser. No. 400,110
Claims priority, application Japan, Oct. 7, 1963, 38/53,660
1 Claim. (Cl. 73—231)

This invention relates to a turbine type mass-flow meter. According to this turbine type mass-flow meter, a mass-flow to be measured flows in a tube 1 toward the right from an end 2, as shown in the accompanying drawing FIG. 1. Even though a turbine A receives rotatory force by the flow at the vanes thereof which are formed spirally to the axis of the tube, the turbine A rotates to an extent of torsional angle $\phi$ which is balanced with the restoring force of a spiral spring 6 and comes to a standstill at the balanced position of the angle $\phi$. Accordingly, the torsional angle $\phi$ of the vane is equal to rotation torque, which is represented by $K_1 m V^2$, wherein $K_1$ is a constant which is decided by the diameter of the turbine A and by the lift factor, the drag factor or the elevation angle factor of the turbine A to the fluid, and $m$ and $V$ are respectively mass and velocity of the fluid to be measured. Another turbine B which is disposed in parallel to the axis of the tube and has straight blades can rotate freely without any restoring force, so the turbine B rotates by the vortex fluid provided by the turbine A in the upper stream, that is, the turbine B rotates corresponding to the flow velocity V of the fluid.

It is an object of this invention to obtain mass-flow $mV$ of the fluid by calculating $mV^2/V$, $mV^2$ which is provided by measuring the torsional angle $\phi$ of the turbine A and the velocity V which is provided by measuring the number of rotations of the turbine B.

Figure 1:
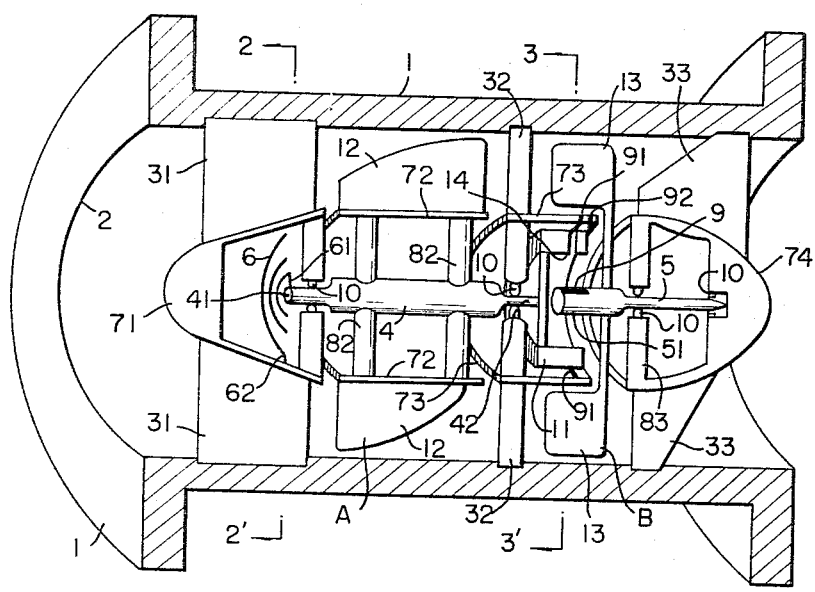
Figure 2:
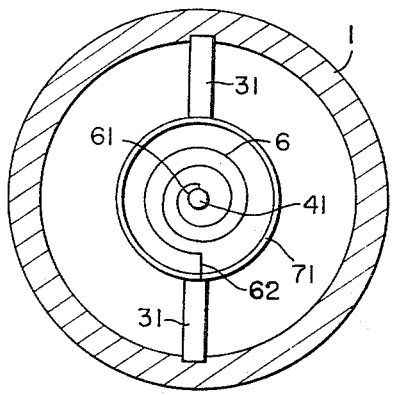
Figure 3:
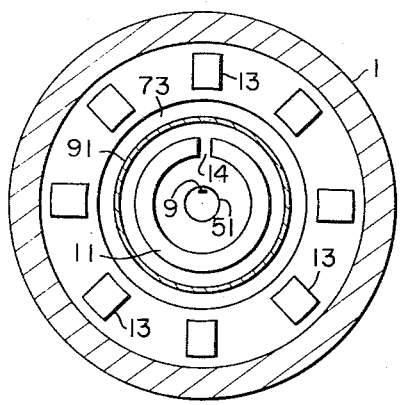
Figure 4:
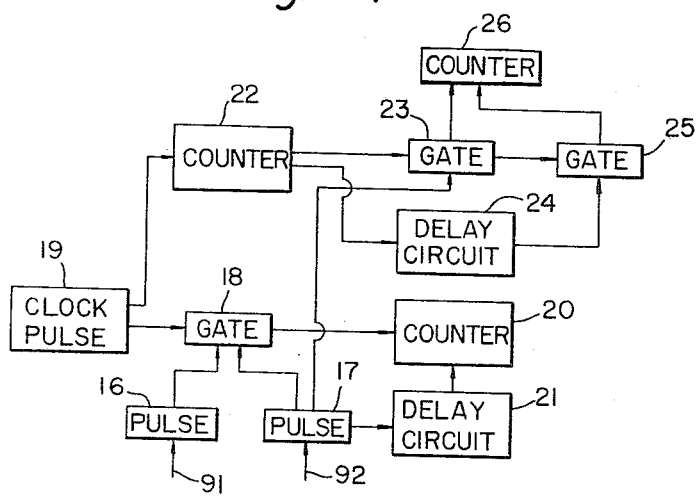

The nature of the invention will be better understood from the following description of one embodiment thereof taken in conjunction with the accompanying drawing in which:

FIG. 1 shows a perspective partially sectional view of an embodiment of the mass-flow meter provided in accordance with the present invention, FIG. 2 shows a sectional view along line 2–2' of FIG. 1, FIG. 3 shows a sectional view along a line 3–3' of FIG. 1, and FIG. 4 shows a network in block form indicative of a signal output circuit.

Referring to FIG. 1, supporters 31, 32 and 33 are mounted on the tube 1, these supporters support a shaft 4 of turbine A and a shaft 5 of the turbine B rotatably by means of bearing equipment 10. Referring to FIG. 2, one end 61 of a spiral spring 6 is rigidly clamped on one end 41 of shaft 4 and the other end 62 of spiral spring 6 is rigidly clamped on supporters 31 through 71. Furthermore, on the other end 42 of shaft 4 there is provided a radiant ray shield annular body 11 therein, which can be rotated by rotation movement of shaft 4. A radiant ray source 9 is buried in one end 51 of shaft 5 of the turbine B, and end 51 of shaft 5 is surrounded by the radiant ray shield annular body 11.

The cover 71 which is mounted on supporter 31 covers spiral spring 6. A cover 72 covers shaft 4 and is supported on shaft 4 by means of supporting lugs 82. Cover 72 is provided with a pair of blades 12 thereon, and so the turbine A comprises a pair of blades 12, cover 72, shaft 4 and supporting lugs 82. A cover 73 which is supported on the supporter 32 covers annular body 11 and provides radiant ray detectors 91 and 92 inside thereof. Cover 74 is rigidly mounted on supporter 33, and a supporting lug 83 of supporter 33 supports shaft 5 rotatably by means of a bearing equipment 10. Shaft 5 rotates with blades 13 mounted on shaft end 51, and radiant ray source 9 is provided in an eccentric portion of shaft end 51. Annular body 11 which covers shaft end 51 is provided with a slit 14 thereon, which is constructed so that radiant ray passes through slit 14 from the radiant ray source 9 outward of annular body 11. The radiant ray detector 91 which detects the radiant ray coming out of slit 14 is equipped in an annular type inside of cover 73. The annular body is equipped with another point-type radiant ray detector 92 inside thereof, which is located at a suitable position inside of annular body 11 where radiant ray coming out of radiant ray source 9 to detector 92 is never interrupted by shield annular body 11.

The operation of the mass-flow meter shown in FIG. 1 is explained as follows:

When the turbine A rotates to the extent of torsional angle $\phi$ by rotatory force from the flowing fluid and is held at the angle $\phi$, annular body 11 also rotates to the extent of an angle equal to the torsional angle $\phi$ and therefore slit 14 of annular body 11 also displaces to the extent of the angle $\phi$. On the other hand, the turbine B rotates by the stream of the fluid having the stream velocity V, and radiant ray through slit 14 of annular body 11 comes to be incident upon radiant ray detector 91 each rotation of the turbine B. Therefore the position of slit 14, that is, the displacement of the torsional angle $\phi$ of the turbine A may be determined by the detection of the radiant ray. At the same time the radiant ray is detected by radiant ray detector 92 each rotation of the turbine B. The time difference $t$ between the detection of detector 91 and that of detector 92 corresponds to the time interval needed for the turbine B to rotate the angle $\phi$, and the detection times of the radiant ray to be detected corresponds to the number of rotations of the turbine B, that is, the stream velocity B of the fluid. This relation can be represented by a formula $V = K_2 W$, where $K_2$ is a constant and W is the angular velocity of the turbine B. It will be easily understood from explanation above that the time difference $t$ is shown by a formula, $$t = \phi / W = K_1 m V^2 / \frac{V}{K_2} = K_1 K_2 m V$$

and that a mass-flow $mV$ can be obtained by the measurement of the time difference between the times at which the radiant ray is incident on the detectors 91 and 92.

Referring to FIG. 4, which illustrates a principle of a device used for measurement of the time difference, pulses generated by detectors 91 and 92 are supplied to a gate 18 through circuits 16 and 17, respectively. Circuits 16 and 17 are respectively a differentiator and an integrator which makes a preferable pulseform to be counted. Gate 18 is designed to be opened when a signal from circuit 16 is supplied thereto, that is, when a pulse is generated by detector 91, and on the other hand to be closed when a signal from circuit 17 is supplied thereto, that is, when a pulse is generated by detector 92. When gate 18 is opened, a clock pulse from a clock pulse oscillator circuit 19 is supplied through gate 18 to a counter 20, which counts and integrates mass-flow $mV$. This operation is held till gate 18 is closed by a pulse generated by circuit 17, which at the same time resets counter 20 through a delay circuit 21. On the other hand, a clock pulse oscillator circuit 19 supplies a trigger pulse to counter 22, which supplies a carry pulse to gates 23 and 25. Opening and shutting periods of gates 23 and 25 are reverse of each other. When gate 23 is opened, pulses passed through circuit 17 are integrated by counter 26 and this operation of counter 26 is continued till gate 23 is closed. Pulses counted by counter 26 indicates the flow velocity V of the fluid. The carry pulse from counter 22 passes through a delay circuit 24 so as to reset counter 26 during an opening period of gate 25. When the mass-flow $m$V indicated by counter 20 is divided with the velocity V indicated by counter 26, the mass $m$ of the fluid can be obtained. Therefore, by comparing a value of the mass $m$ with the value of pre-known mass of the fluid, correction of the measured mass-flow is easily provided.

What is claimed is:

A mass-flow meter comprising
- a housing defining a path along which a fluid is adapted to flow,
- a first, spiral blade turbine mounted in said path for rotation by fluid flowing therealong,
- spring means biasing said first turbine for rotation in a direction opposite to that imparted by said flowing fluid,
- a second, straight blade turbine mounted in said path downstream of said first turbine for free rotation by said flowing fluid,
- a radiant ray source mounted for rotation along with said second turbine,
- a first, point-type radiant ray detector positioned in stationary relationship with respect to said housing and detecting each rotation of said source and said second turbine to produce a first signal upon each rotation of said second turbine,
- a second, annular radiant ray detector positioned in stationary relationship with respect to said housing,
- an annular shield mounted for rotation with said first turbine and interposed between said source and said second detector,
- a slit in said shield to cause said second detector to detect a radiant ray from said source, and to produce a second signal, upon registration between said slit and said source for each rotation of said second turbine, and means to measure the length of the time period between the production of said first and second signals as a measure of the mass flow rate of said fluid.

References Cited by the Examiner

UNITED STATES PATENTS

| | | | |
|---|---|---|---|
| 3,043,138 | 7/1962 | Waugh | 73—194 |
| 3,232,110 | 2/1966 | Li | 73—231 |

RICHARD C. QUEISSER, *Primary Examiner.*

E. D. GILHOOLY, *Assistant Examiner.*